United States Patent [19]
Watanabe et al.

[11] Patent Number: 4,852,869
[45] Date of Patent: Aug. 1, 1989

[54] FEED APPARATUS CAPABLE OF FEEDING IMAGE FORMING MEDIA BY RELATIVELY SMALL DRIVE POWER

[75] Inventors: Junji Watanabe; Ken Iseda, both of Yokohama; Takehito Fukunaga; Akihito Tokutsu, both of Tokyo, all of Japan

[73] Assignee: Kabushiki Kaisha Toshiba, Kawasaki, Japan

[21] Appl. No.: 224,554

[22] Filed: Jul. 26, 1988

[30] Foreign Application Priority Data

Jul. 31, 1987 [JP] Japan .................................. 62-191617
Jul. 31, 1987 [JP] Japan .................................. 62-191618

[51] Int. Cl.[4] ............................................. B65H 1/12
[52] U.S. Cl. .................................... 271/126; 271/155; 271/157; 271/160
[58] Field of Search ............... 271/155, 157, 158, 159, 271/160, 126, 127, 148, 162

[56] References Cited

U.S. PATENT DOCUMENTS 3,768,806  10/1973  Reehil .................................. 271/155
4,033,578  7/1977  Taylor .................................. 271/157

*Primary Examiner*—Richard A. Schacher
*Attorney, Agent, or Firm*—Foley & Lardner, Schwartz, Jeffery, Schwaab, Mack, Blumenthal & Evans

[57] ABSTRACT

A feed apparatus for feeding paper to a copy machine is disclosed. Paper on a paper table is vertically moved by a lift mechanism. The lift mechanism is made up of a coupling mechanism, a transmitting mechanism, and a mounting mechanism. This mechanism transmits a drive force from a motor and a motor drive to the paper table, to vertically move the table. The table has an elastic member attached thereto. The elastic member has a predetermined elastic force to move the table upwardly. The table is lifted by cooperation of the lift mechanism and the elastic member. A controller applies a command to the motor to drive a transport mechanism. The driven transport mechanism picks up paper sheet by sheet and feeds it to the copy machine.

10 Claims, 21 Drawing Sheets

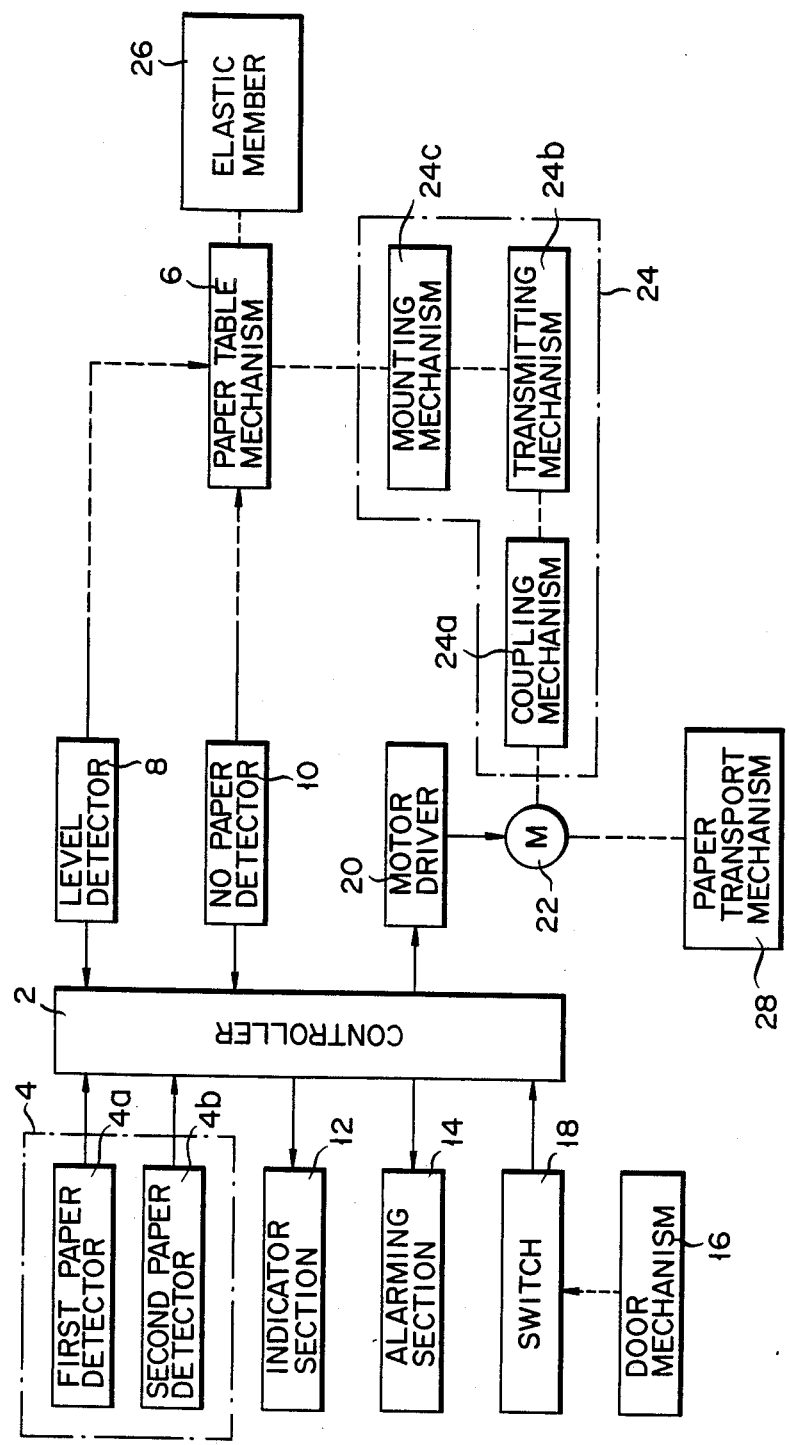
F I G. 1

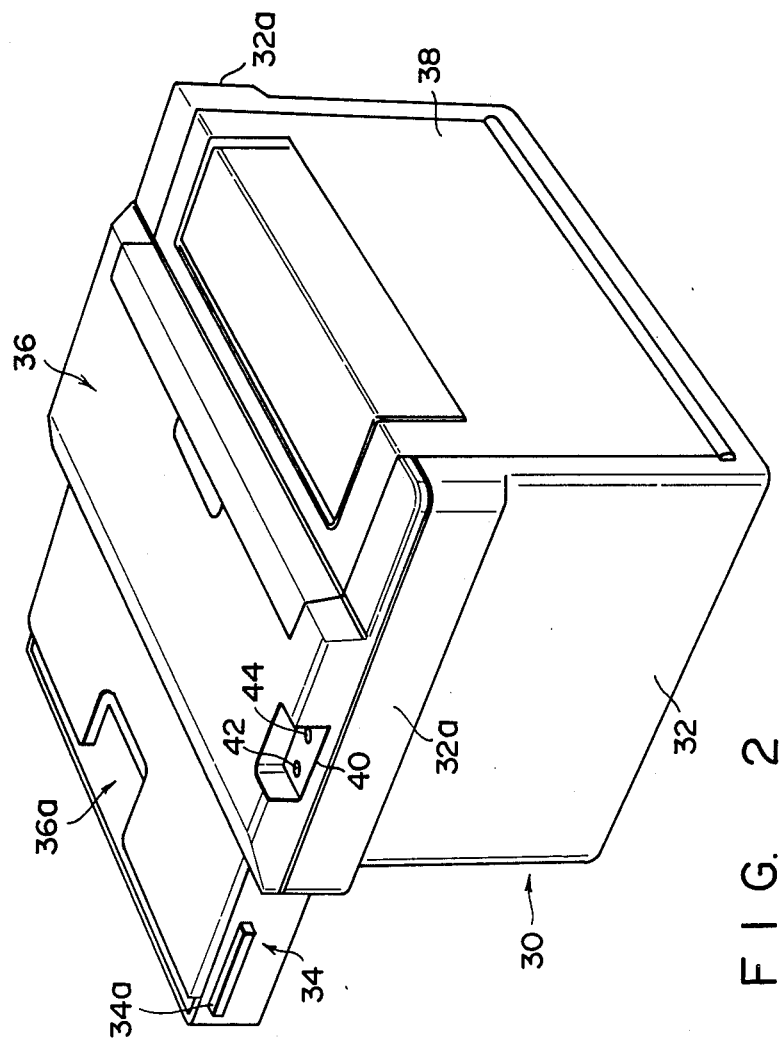
F I G. 2

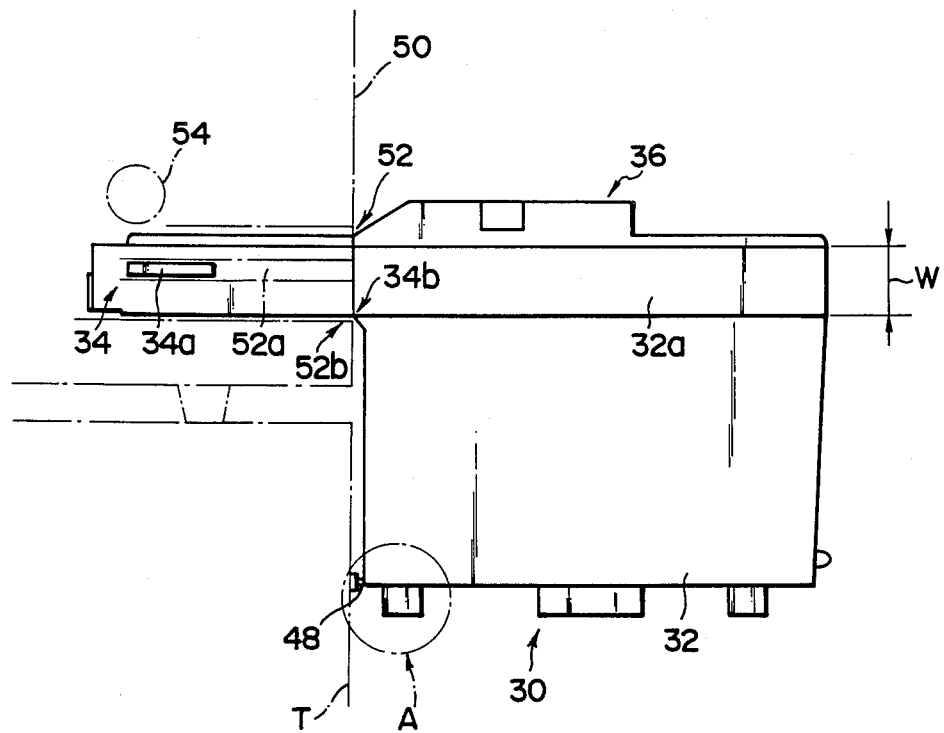
F I G. 4

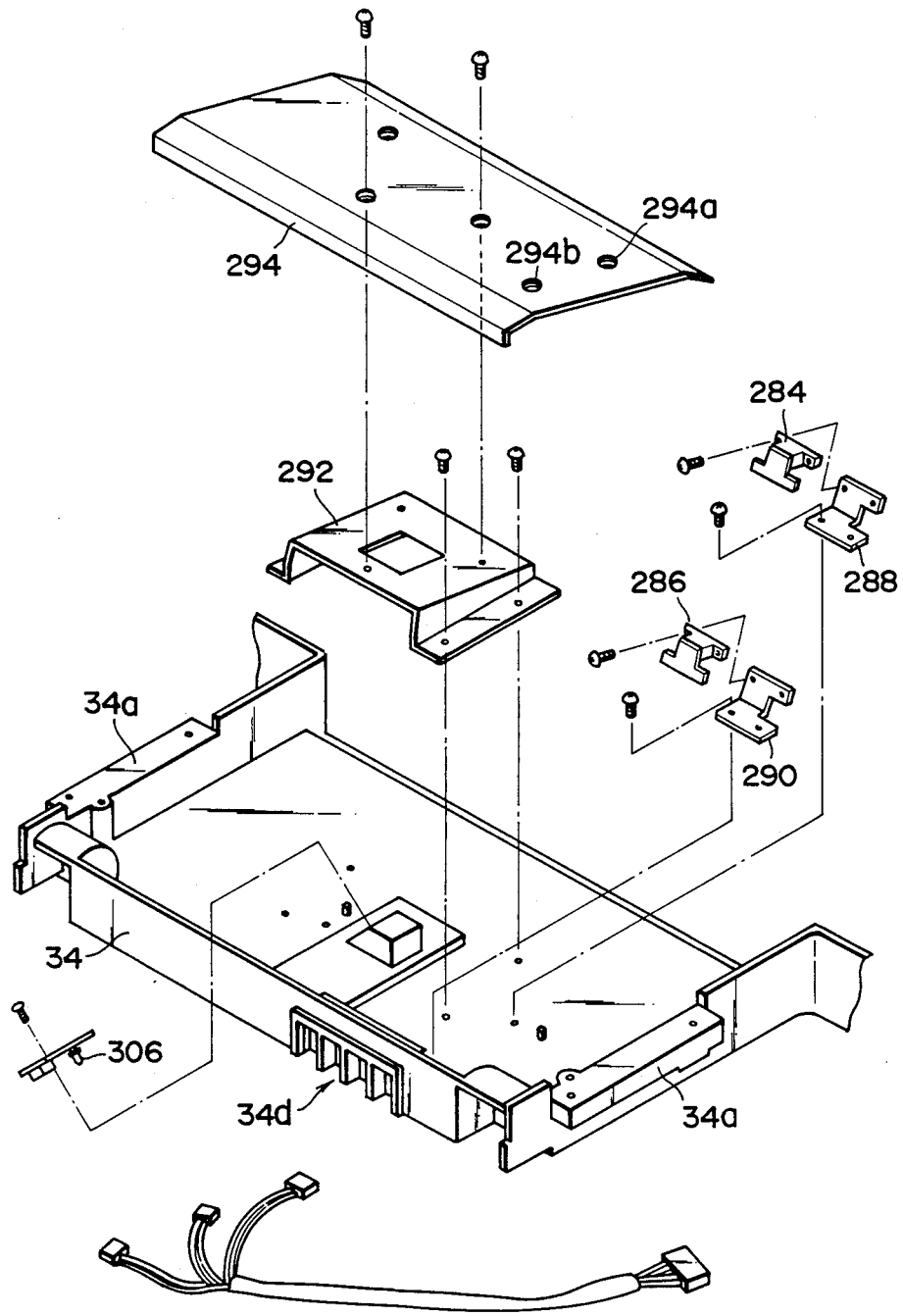
F I G. 20

FEED APPARATUS CAPABLE OF FEEDING IMAGE FORMING MEDIA BY RELATIVELY SMALL DRIVE POWER

BACKGROUND OF THE INVENTION

1. Field of the Invention

The present invention relates to a feed apparatus for feeding image forming media, and more particularly to a feed apparatus capable of feeding a lot of image forming media by a relatively small drive power source.

2. Description of the Related Art

In the field of image forming apparatus, for example, electronic copying machines, there have been developed various types of feed apparatus capable of feeding a large volume of paper as image forming media, which is larger in volume than that by normal feed cassette. In use, this type of feed apparatus is externally coupled with a main body of a copy machine. The feed apparatus contains a paper table on which a volume of paper is placed thereon. The table is lifted according to a height of stacked paper placed thereon. The paper is fed to the copy machine, from the lifted paper table.

The conventional feed apparatus is so designed that a motor as a drive source for lifting the table, directly drives the table. To lift the table fully loaded with paper, a great drive power is required. Therefore, that the conventional feed apparatus needs a motor with a large drive capability.

SUMMARY OF THE INVENTION

Accordingly, an object of the present invention is to provide a feed apparatus for feeding paper to the copy machine, which is operable with a small motor even when the table is at full load.

According to one aspect of the present invention, there is provided a feed apparatus for feeding image forming media to an image-forming apparatus, comprising means for holding the image forming media, the holding means being movable between a feed position from which the image forming media are fed into the image-forming apparatus and a non-feed position, means for constantly urging the holding means toward the feed position, the urging means having a predetermined urging force, means for producing a driving force to move the holding means, the holding means being moved to the feed position by utilization of both the driving force and the urging force, and means for permitting the driving force of the producing means to be transmitted to the holding means only in the case where the holding means should be moved to the feed position, and for, in the other cases, preventing a force acting toward the feed position from being transmitted to the holding means, except for the urging force of the urging means.

BRIEF DESCRIPTION OF THE DRAWINGS

These and other features and advantages of the present invention will become more apparent from the following detailed description of exemplary embodiment as illustrated in the accompanying drawings in which:

FIG. 1 shows a block diagram of a scheme of a control system used in a feed apparatus for feeding image forming media according to one embodiment of the present invention;

FIG. 2 shows a perspective view illustrating an appearance of the feed apparatus;

FIG. 4 shows a side view illustrating the feed apparatus when it is coupled with a copy machine;

FIGS. 20 and 21 show respectively exploded views showing the structure of a coupling portion of the feed apparatus by which the apparatus is coupled with a copy machine.

DETAILED DESCRIPTION OF THE PREFERRED EMBODIMENTS

Figure 3:
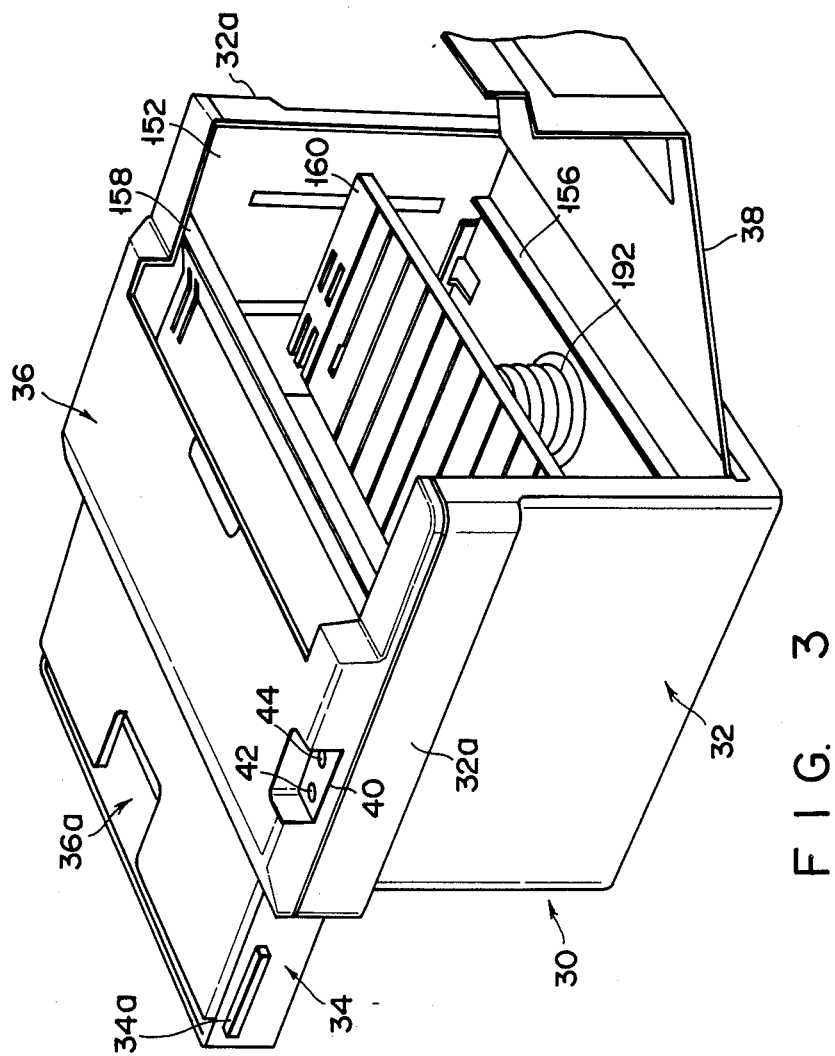
FIG. 3 shows a perspective view illustrating an appearance of the feed apparatus whose door is left open.

A preferred embodiment of the present invention will be described referring to the accompanying drawings.

FIG. 1 shows a scheme of an electronic control system for a feed apparatus for feeding image forming medium such as paper, which is an embodiment of this invention. In the FIG. 1, controller 2 controls the operation of an overall system of the feed apparatus. Controller 2 is coupled with paper detecting mechanism 4 made up of first and second paper detectors 4a and 4b. It is further connected to level detector 8 for detecting a height or level of the uppermost paper on paper table mechanism 6 to be given later, and no paper detector 10 for detecting no paper or absence of paper on paper table mechanism 6. Controller 2 is additionally coupled with indicator section 12, alarming section 14, and switch 18. indicator section 12 indicates the power on and off, jamming, and the like. Alarming section 14 indicates the detection of detector 10 by a light emitting diode (LED), for example. Switch 18 detects open and close of door mechanism 16. Controller 22 is coupled for transmission with drive source 22 such as a motor, via motor driver 20. Drive source 22 drives and moves up and down paper table mechanism 6 through lift mechanism 24. Lift mechanism 24 is made up of coupling mechanism 24a, transmitting mechanism 24b, and mounting mechanism 24c. Coupling mechanism 24a includes pulleys coupled with drive source 22. Transmitting mechanism 24b includes belts for transmitting a drive power from coupling mechanism 24a to paper table mechanism 6. Mounting mechanism 24c is fixed to transmitting mechanism 24b, and also to paper table mechanism 6. Elastic member 26 such as a spring is secured to paper table mechanism 6. Elastic member 26 exerts an elastic force in a given direction on paper table mechanism 6. The drive force as transmitted through lift mechanism 24 including transmitting mechanism 24b from drive source 22, and the elastic force of elastic member 26, cooperate to lift paper table mechanism 6. Therefore, even if table mechanism 6 is fully loaded with paper, it can be lifted by a relatively small drive force of drive source 22. The drive force of drive source or motor 22 is also transmitted to paper transport mechanism 28 including rollers.

An appearance of the feed apparatus is illustrated in FIGS. 2 and 3. Feed apparatus 30 is made up of main body 32 made of synthetic resin, connecting mechanism 34, cover 36, door 38 as door mechanism 16. Main body 32 houses lift mechanism 24 for lifting a paper table, which will be subsequently described in detail. Connecting mechanism 34 is integral with main body 32. Cover 36 covers the upper portions of connecting mechanism and main body 32, and is provided with a paper transporting mechanism to be given later, and electronic circuits. Door 38 is swingably secured to main body 32.

Connecting mechanism 34 connects feed apparatus 30 with a main body 50 of a copy machine, as shown in FIG. 4. It resembles a normal feed cassette to be loaded to copy machine main body 50. Connecting mechanism 34 has protruded portions 34a on both sides. When connecting mechanism 34 is inserted into feed cassette loading mechanism 52 of main body 50, protruded portions 34a and routing portions 34b of connecting mechanism 34 are respectively fit into guide grooves 52a and openings 52b of loading mechanism 52, whereby feed apparatus 30 is reliably attached to copy machine main body 50.

Main body 32 of feed apparatus 30 has projections 32a on both sides. Projections 32a are in flush with connecting mechanism 34 and are spaced at the distance equal to the width of connecting mechanism 34. Connecting mechanism 34 and projections 32 provides a configuration resembling the normal feed cassette. With such a configuration, an operator can load feed apparatus 30 into and remove it from main body 50 by holding projections 32a by the hands in a manner that he handles the normal paper cassette.

Figure 6:
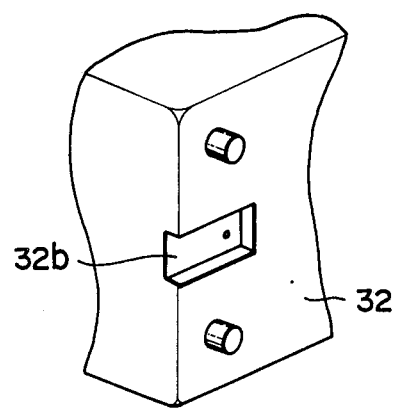
FIGS. 6 and 7, respectively, show a perspective view partially illustrating the bottom of the feed apparatus, and a side view illustrating how a supporting member is used when the feed apparatus is set to the copy machine.
Figure 7:
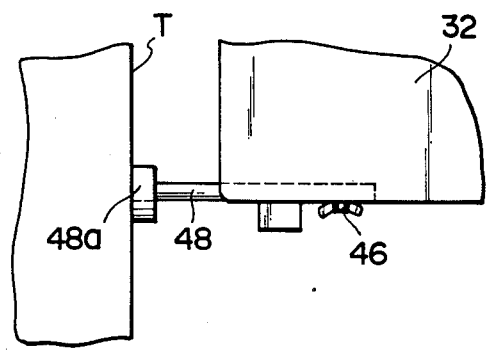

As illustrated in FIGS. 2 and 3, cover 36 has control panel 40 as indicator section 12 for feed apparatus 30 at one side of cover 36. Control panel 40 contains light emitting diode (LED) 42 for indicating power on and off, and LED 44 for indicating jamming in feed apparatus 30. Cover 36 has notch 36a in its portion covering connecting mechanism 34. When feed apparatus 30 is coupled with copy machine main body 50, notch 36a accepts pick-up roller 54 of the copy machine, as illustrated in FIG. 4. Recess 32b is formed at the bottom of main body 32 of the feed apparatus, viz., in the portion as indicated by circle A in FIG. 4, and is configured as shown in FIG. 6. One end portion of supporting member 48 is placed in and fixed to this recess 32b by thumbscrew 46, as shown in FIG. 7. The other end of supporting member 48 contacts at the end face with supporting pad 48a made of rubber, for example, which is attached on the side wall of table T on which copy machine 50 is placed. With use of supporting member 48, feed apparatus 30 can be horizontally kept even when it is fully loaded with paper.

Alternatively, supporting member 48 may be in contact with the copy machine main body 50, not table T, if the main body configuration allows such a mechanism.

Figure 5:
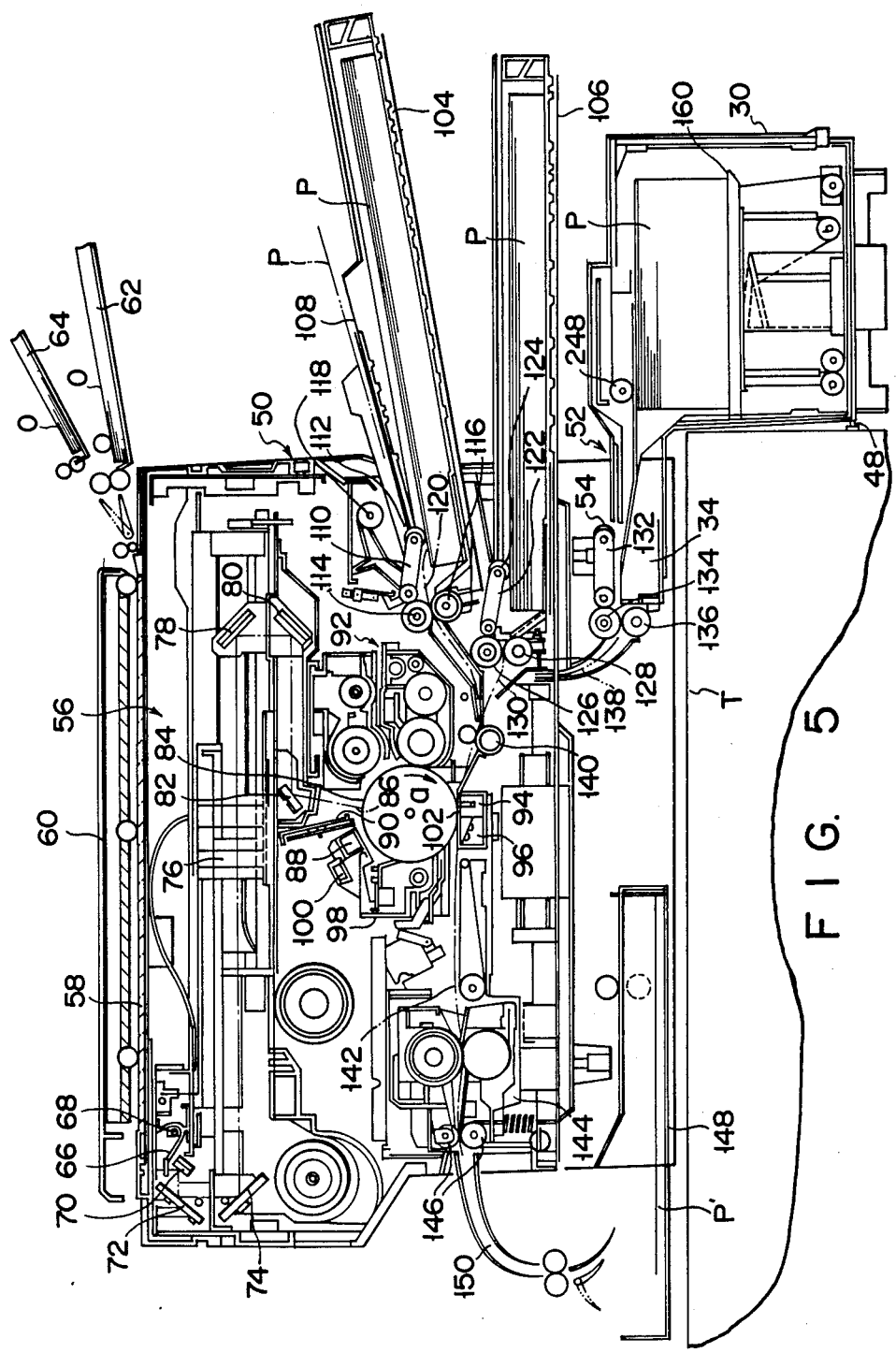
FIG. 5 shows a longitudinal sectional view of the copy machine and the feed apparatus, when those are coupled with each other.

A longitudinal sectional view of FIG. 5 shows the copy machine and the feed apparatus 30 when the latter is set to the main body 50 of the copy machine. As shown, the copy machine is placed on table T. In main body 50, image forming processing mechanism 56 is provided for executing a sequence of image processings, such as charging, exposure, development, transfer, cleaning, and fixing. Glass plate 58 is fit in an opening of the top of main body 50. Original O is set on glass plate 58. Automatic original feeder 60 is installed above glass plate 58. Original feeder 60 feeds original O onto glass plate 58, and removes the original O after optically scanned and transports it outside. Feeder table 62 for feeding original O and exit table 64 into for holding exit original O are located on the right side of automatic original feeder unit 60.

Image forming processing mechanism 56 will be described in detail. A light beam emitted from exposure lamp 68 enclosed by reflector 66 is reflected at original O place on glass plate 58, and led to lens 76 through first to third mirrors 70, 72, and 74. The light beam passed through lens 76 is successively reflected at 4th to 6th mirrors 78, 80 and 82, and led to exposure mechanism 86 of photoconductive drum 84 as an image carrier. This drum 84 is located substantially at the center of the main body 50, and is rotatable in a given direction.

Main charger 88, erasing unit 90, exposure mechanism 86, developing unit 92, transfer unit 94, separation charge 96, cleaning unit 98, discharge lamp 100, and the like are disposed around photoconductive drum 84 in this order in the clockwise direction as indicated by arrow a. Image transfer mechanism 102 is located between the drum 84 and transfer unit 94.

First and second feeder cassettes 104 and 106 for feeding paper P to image forming processing mechanism 56, and feed apparatus 30 capable of holding a lot of paper are inserted to the right side of main body 50. Manual feeder 108 is installed above first feeder cassette 104. Pick-up roller 112 rotatably secured to swing arm 110, feed roller 114, separation roller 116, and manual feed roller 118 are disposed near the end of the inserted first feed cassette 104 within the main body 50. With rotation of these rollers, paper P is picked up sheet by sheet from cassette 104 and transported through paper transport path 120 to transfer mechanism 102. Pick-up roller 124 rotatably secured to swing arm 122, feed roller 126, and separation roller 128 are disposed near the end of the inserted second feed cassette 106 within the main body 50. With rotation of these rollers, paper P is picked up sheet by sheet from cassette 106 and transported through paper transport path 130 to transfer mechanism 102. Pick-up roller 54 rotatably secured to swing arm 132, feed roller 134, and separation roller 136 are disposed near the inserted connecting mechanism 34 of feed apparatus 30. With rotation of these rollers, paper P is picked up sheet by sheet from feed apparatus 30 and transported through paper transport path 138 to transfer mechanism 102. Aligning roller 140 is disposed upstream of transfer unit 102.

In the left part of main body 50, fixing unit 144 is located downstream of transfer unit 102 with paper transport path 142 interposed therebetween. Exit roller pair 146 is located downstream of fixing unit 144. More specifically, exit tray 148 is set to the left bottom corner of main body 50. The first half of exit trays 148 is outside main body 50 while the second half is inside. Exit tray 148, located downstream of exit roller pair 146, accumulatively receives fixed paper P'. Paper exit unit 150 for guiding fixed paper P' into exit tray 148 is further located between exit roller pair 146 and exit tray 148. Paper exit unit 150 is curved in shape to turn transported fixed paper P' upside down and put it into exit tray 148.

Lift mechanism 24 for lifting paper table 160 within feed apparatus 30 will be described referring to FIGS. 8 through 11.

In these figures, first and second side frames 152 and 154 are disposed along the inner side walls of the main body 32 of feed apparatus 30. These frames 152 and 154 are spaced from each other and fixed by first and second fixing frames 156 and 158. To this end, first fixing frame 156 is fixed at one end to the lower side of first side frame 152 by fixing means, while fixed at the other end to the lower side of second side frame 154. Similarly, second fixing frame 158 is secured at one end to the upper side of first side frame 152, while at the other end to the upper side of second side frame 154. Leg portions 152a and 154a of first and second side frames 152 and 154 are fixed to the protruded portions 34a of connecting mechanism 34 by means of fixing means, respectively.

Figure 10:
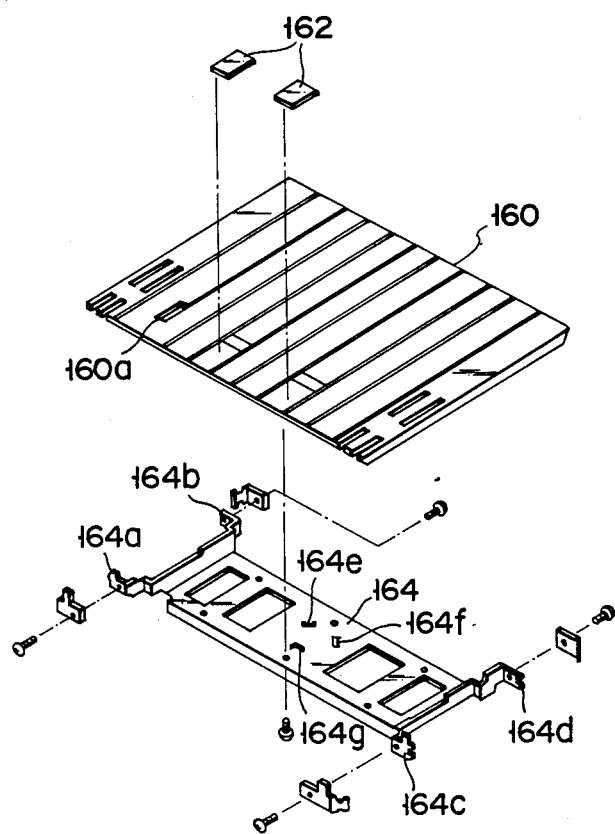
FIG. 10 shows an exploded view of a table for holding paper.

Paper table 160 (paper table mechanism 6) as shown in FIG. 10 is inserted between first and second side frames 152 and 154. Brake pads 162 are provided at the center portion of paper table 160. Through-hole 160a exists near brake pads 162. The top end portion of a no paper detecting member to be given later is inserted into this through-hole 160a. Frame 164 is mounted on the reverse side of paper table 160. Leg portions 164a, 164b, 164c and 164d are formed at the four corners of frame 164. These leg portions 164a to 164d are respectively inserted into slits 152b and 152c, and 154b and 154c of first and second side frames 152 and 154, as shown in FIGS. 8 and 11.

Figure 8:
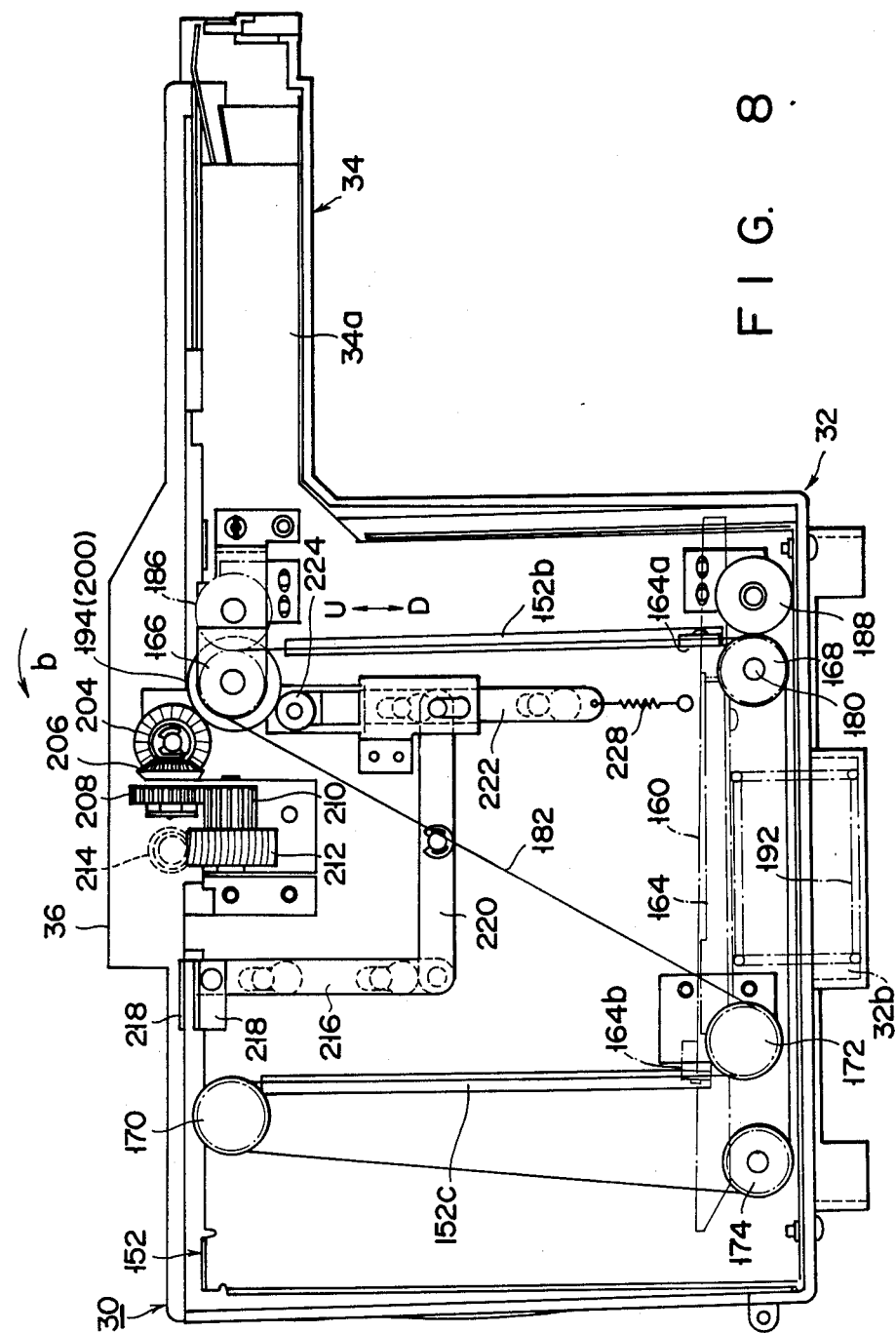
FIG. 8 shows a longitudinal sectional view of the feed apparatus, the illustration particularly showing a lift mechanism for vertically moving a paper holding table.
Figure 9:
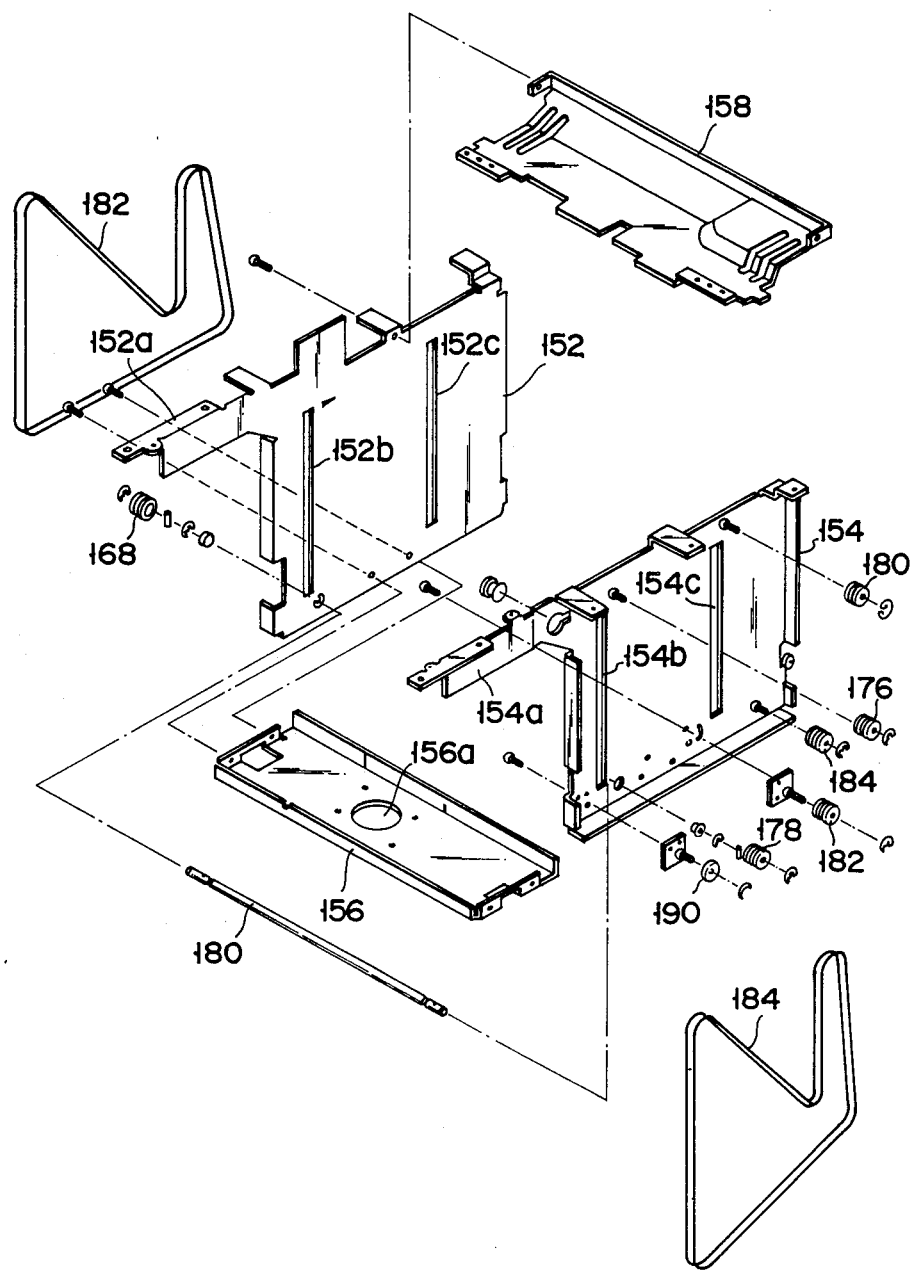
FIG. 9 shows an exploded view of the lift mechanism of the feed apparatus.

Pulleys 166 and 168, and 170 and 172 are respectively provided at the end portions of slits 152b and 152c of first side frame 152, as shown in FIG. 8. Pulley 174 is located near pulley 172. Pulleys 176 and 178, and 180 and 182 are respectively provided at the end portions of slits 154b and 154c of second side frame 154, as shown in FIGS. 9 and 11. Pulley 184 is additionally provided near pulley 182. These pulleys 166 and 168, and 170 and 172, and 174 (FIG. 8) are disposed corresponding to pulleys 176 and 178, 180 and 182, and 184 (FIG. 11), respectively. Those pulleys 166 to 184, pulleys 168 and 178 are fixed to both ends of shaft 186, and rotate together, with the shaft rotation.

Figure 11:
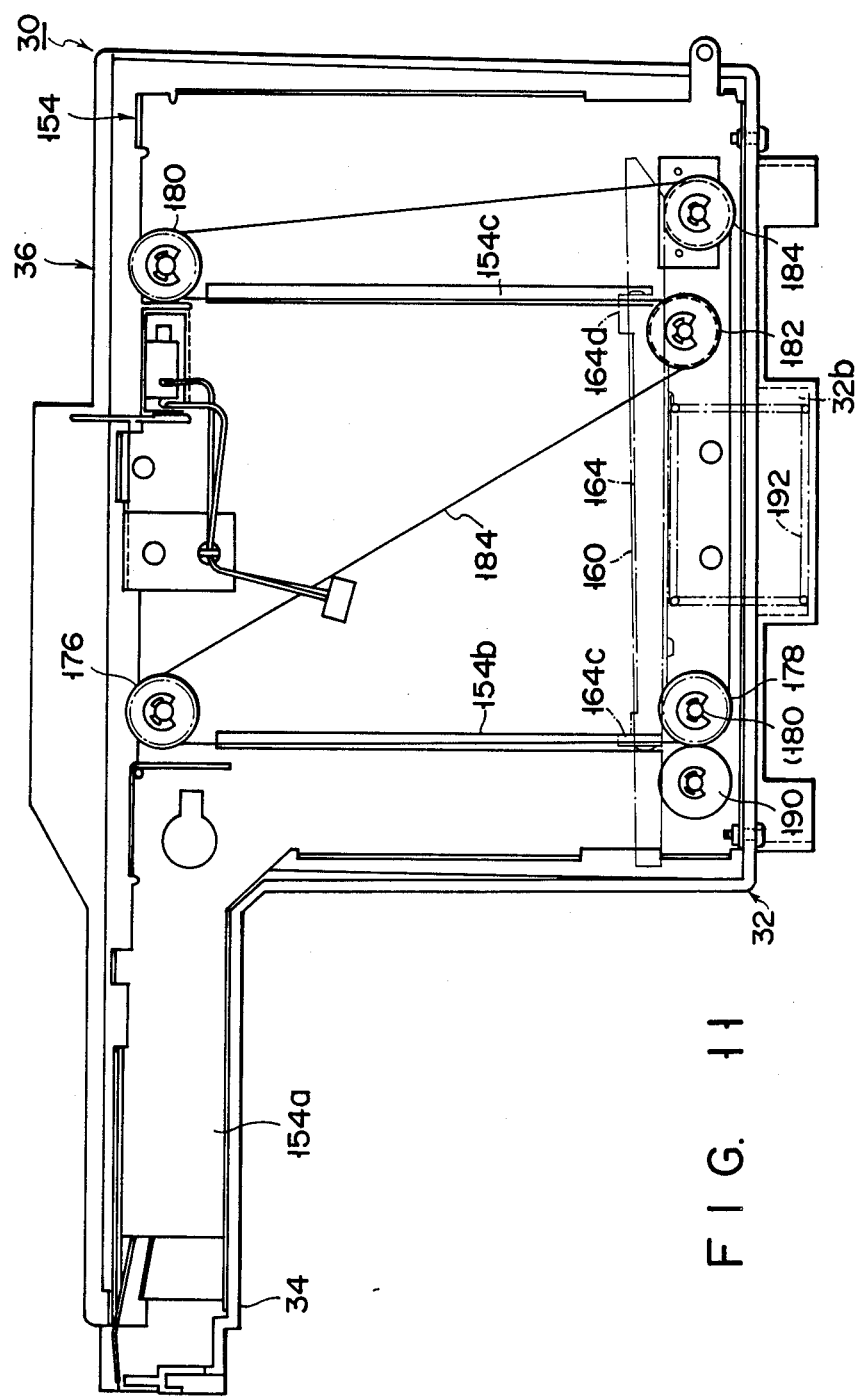
FIG. 11 shows a side view of the feed apparatus, this side being opposite to that of FIG. 8.

Endless timing belts 182 and 184 are respectively wound around pulley group 166 to 174, and another pulley group 176 to 184, partially along slits 152b and 152c, and 154b and 154c (see FIGS. 8, 9 and 11). The wound timing belts are shaped like a letter of M. These timing belts 182 and 184 are in contact with rollers 186, 188 and 190 respectively disposed near pulleys 166, 168 and 178. Timing belts 182 and 184 are respectively fixed to paired leg portions 164a and 164b, and paired 164c and 164d. Table 160 is vertically moved along slits 152b and 152c, and 154b and 154c by timing belts 182 and 184, while being postured horizontally.

Spring 192 as elastic member 26 is provided between paper table 160 and the bottom of main body 32. One end of spring 192 is placed in recess 32b of the bottom of main body 32 through through-hole 156a of first fixing frame 156, as shown in FIG. 9. The other end is fixed to the engaging legs 164e, 164f and 164g of frame 164 mounted on paper table 160. Spring 192 always biases paper table 160 upwardly.

Spring 192 is long enough to push up paper table 160 till the top ends of slits 152b and 152c, and 154b and 154c. An elastic force of spring 192 is slightly weaker than the force to move the stacked paper of a maximum weight placed on table 160.

First side frame 152 is provided with a drive mechanism for driving timing belts 182 and 184, which is one of the components constituting the lift mechanism 24 of table 160.

This will be described referring to FIG. 8, and FIGS. 12 through 15. As shown, pulley 166 is integral with gear 194 whose diameter is larger than that of pulley 166. The combination of pulley 166 and gear 194 is fixed to rotating shaft 198, with one-way clutch 196 interposed therebetween. With this structure, when timing belt 182 is moved to pull down paper table 160 in the direction of arrow D (FIG. 8), one-way clutch 196 is locked to shaft 198, so that the pulley-gear combination rotates together with rotating shaft 198. When timing belt 182 is moved in the reverse direction, clutch is freed from rotating shaft 198.

Gear 200 is fixed to rotating shaft 194. The diameter and the number of teeth of this gear 200 are the same as those of gear 194. Gear 200 is in mesh with gear 202. Bevel gear 204 is fixed to gear 202, and is in mesh with bevel gear 206. This gear 206 is fixed to gear 210. Gear 210 is formed integral with gear 212. Gear 212 meshes with worm gear 214 which is driven by a motor as drive source 22 to be given later.

With the drive mechanism thus structured, when a maximum volume of paper P is placed on table 160, a force to lower table 160 exerts on the table which is constantly upwardly biased by spring 192, and is transmitted through pulley 166, and a chain of gears 194 to 212 to worm gear 214. Under this condition, a difference between the down force by the paper stack and the bias force by spring 192 is applied to paper table 160. Actually, however, table 160 is at standstill because resistance between gear 212 and worm gear 214 is selected to be such a value as to prevent table 160 from dropping. This selected resistance also prevents table 160 from rising when no paper is placed on paper P table 160.

Figure 12:
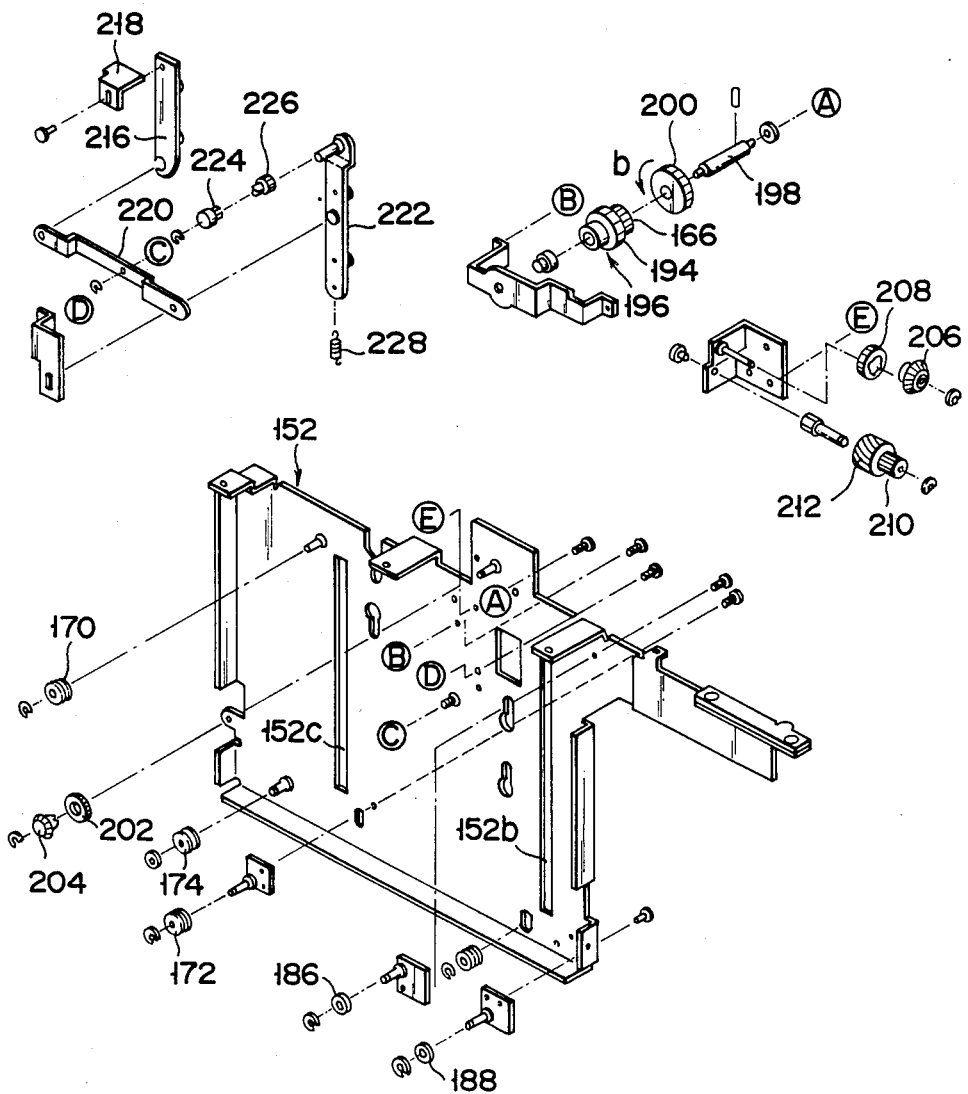
FIGS. 12 through 15 show views illustrating a drive mechanism of the lift mechanism, FIG. 12 showing the structure of the drive mechanism in an exploded manner, FIG. 13 sectionally showing a key portion of the drive mechanism as viewed in the direction different from that of FIG. 8, FIG. 14 sectionally showing the key portion as viewed from top and FIG. 15 showing a sectional view of the lift mechanism which is operated, with different layout of some related components being different from those illustrated in FIG. 8.
Figure 13:
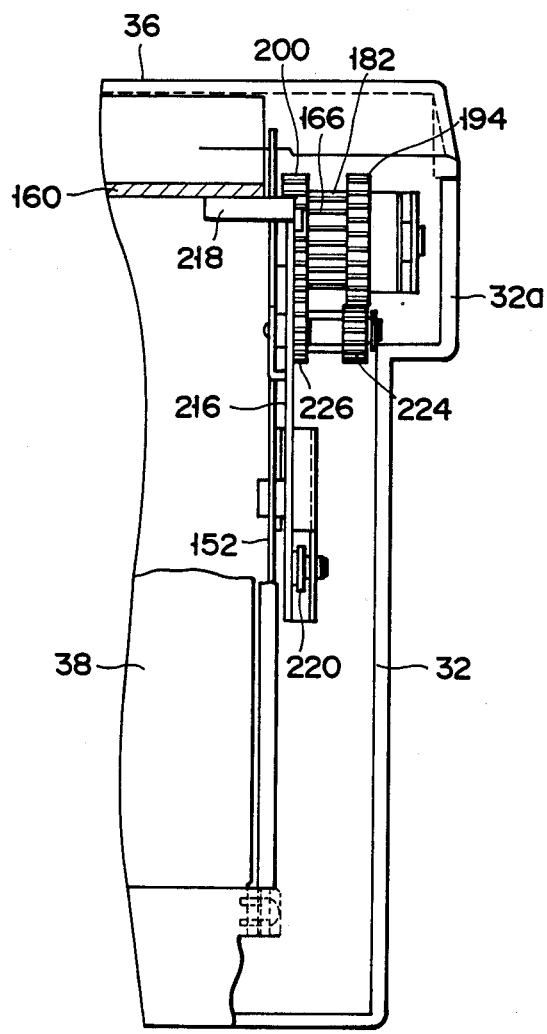
Figure 14:
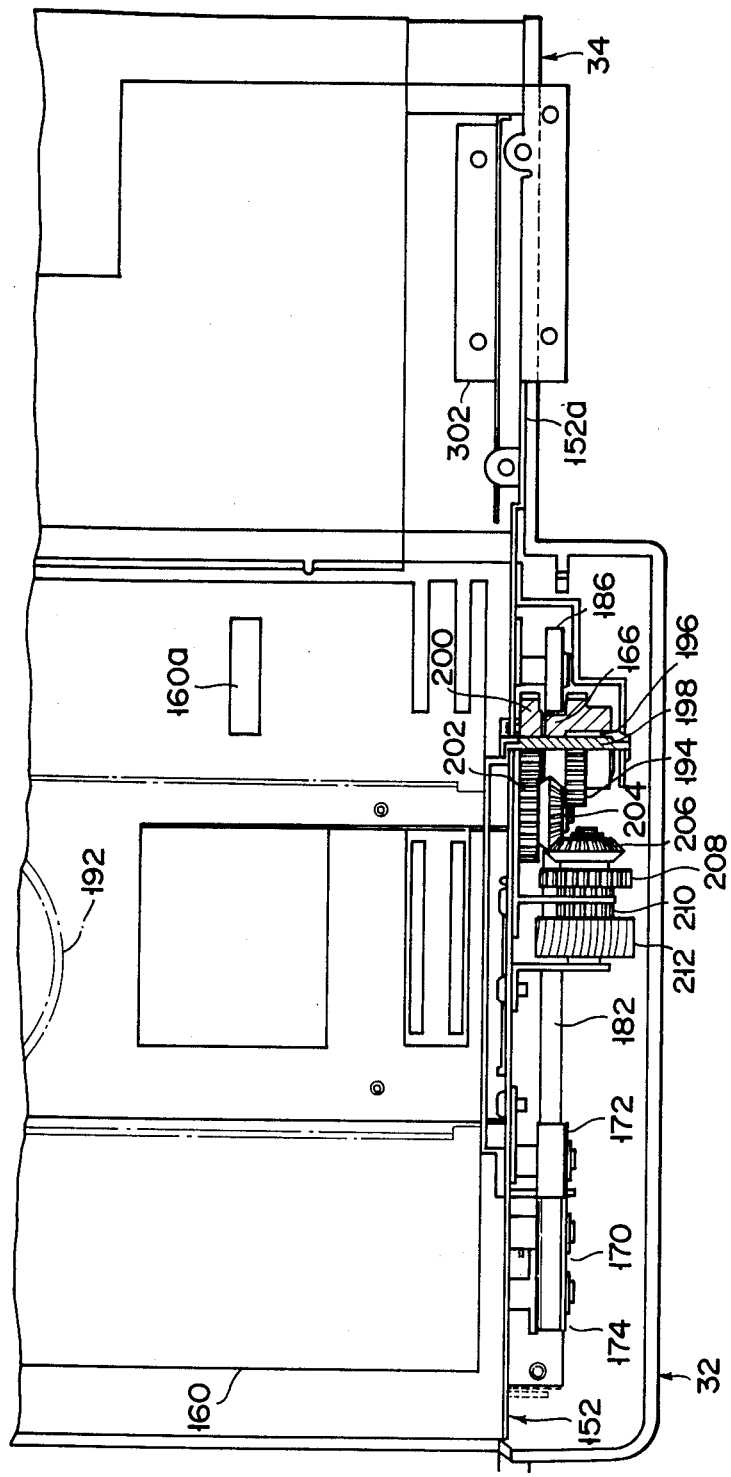

First lever 216 constituting a drive force coupling means, which is provided on the side wall of first side frame 152, is movable along with paper table 160, as shown in FIGS. 8, 12 and 13. First lever 216 is provided with contact member 218 at the top end, which is to contact with door 38. The bottom end is coupled with one end of link member 220. Link member 220 is swingably attached at the mid portion to the side wall of first side frame 152. The other end of link member 220 is attached to the mid portion of second lever 222. Second lever 222 is movable in parallel with first lever 216. A couple of gears 224 and 226 having the same number of teeth and the same diameter are formed integral with the top end portion of second lever 222. These gears 224 and 226 are in mesh with gears 194 and 200. Spring 228 is provided between the bottom end of second lever 222 and first side frame 152. This spring 228 constantly biases second lever 222 toward the bottom of main body 32.

Figure 15:
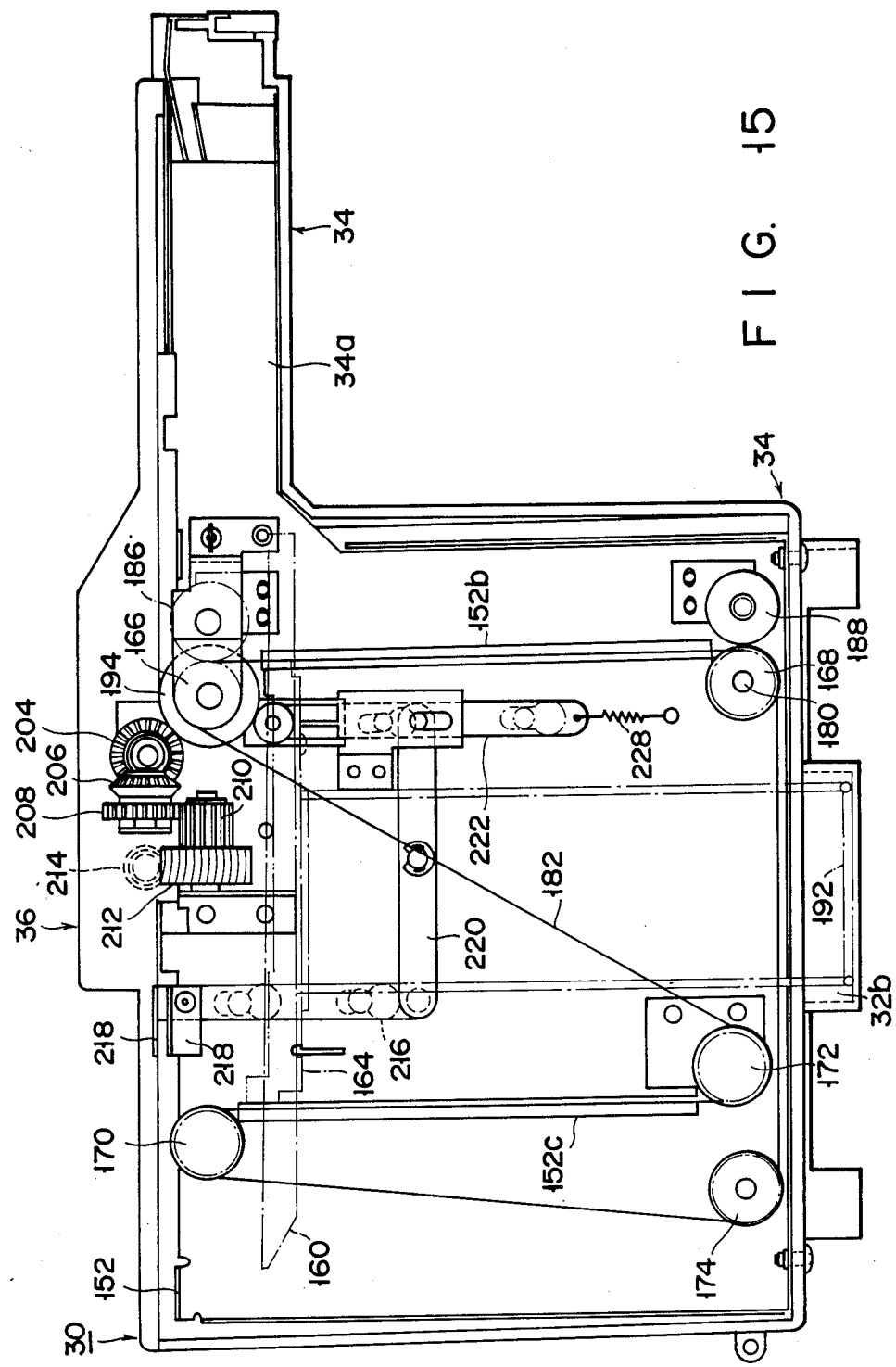

With such a structure, when door 38 is open, spring 228 moves second lever 222 toward the bottom of main body 32. Paired gears 224 and 226 are detached from paired gears 194 and 200. When door 38 is closed, second lever 222 overcomes the elastic force of spring 228, and movers upwardly, viz., departs from the bottom of main body 32. Paired gears 224 and 226 are in mesh with paired gears 194 and 200. Under this condition, gears 194 and 200 are rotatable together. When gear 200 is rotated in the direction b by worm gear 214, as shown in FIGS. 8 and 12. the gear 194, which is freed from shaft 198 by one-way clutch 196, is rotated in the same direction as the direction b. Finally, paper table 160 is lifted in the direction of U. FIG. 15 shows the lift mechanism when paper table 160 is lifted.

Description to follow is for the paper transport mechanism attached to cover 36, and sensors.

Figure 16:
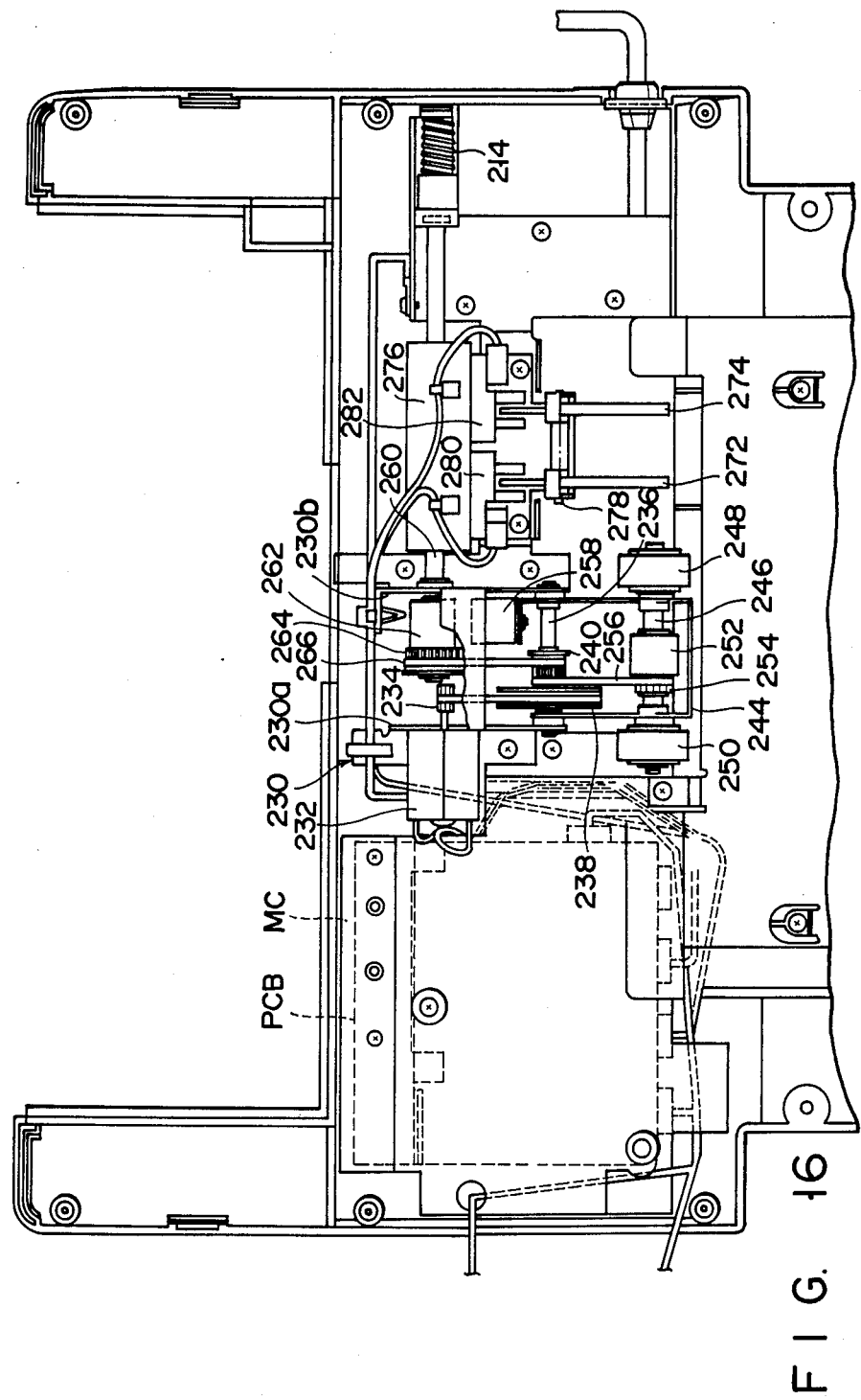
FIGS. 16 through 19 show views illustrating a cover structure, FIG. 16 showing a key portion as viewed from top, FIG. 17 showing a side view partially broken of the key portion, and FIGS. 18 and 19 showing exploded views of the key portion.
Figure 17:
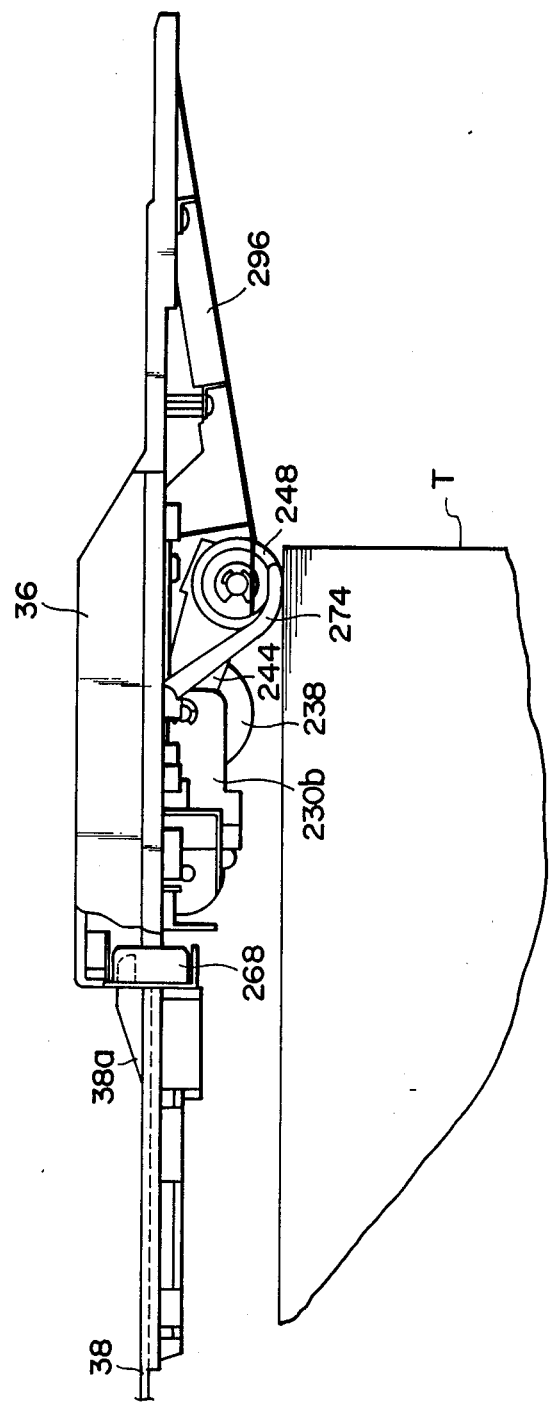
Figure 18:
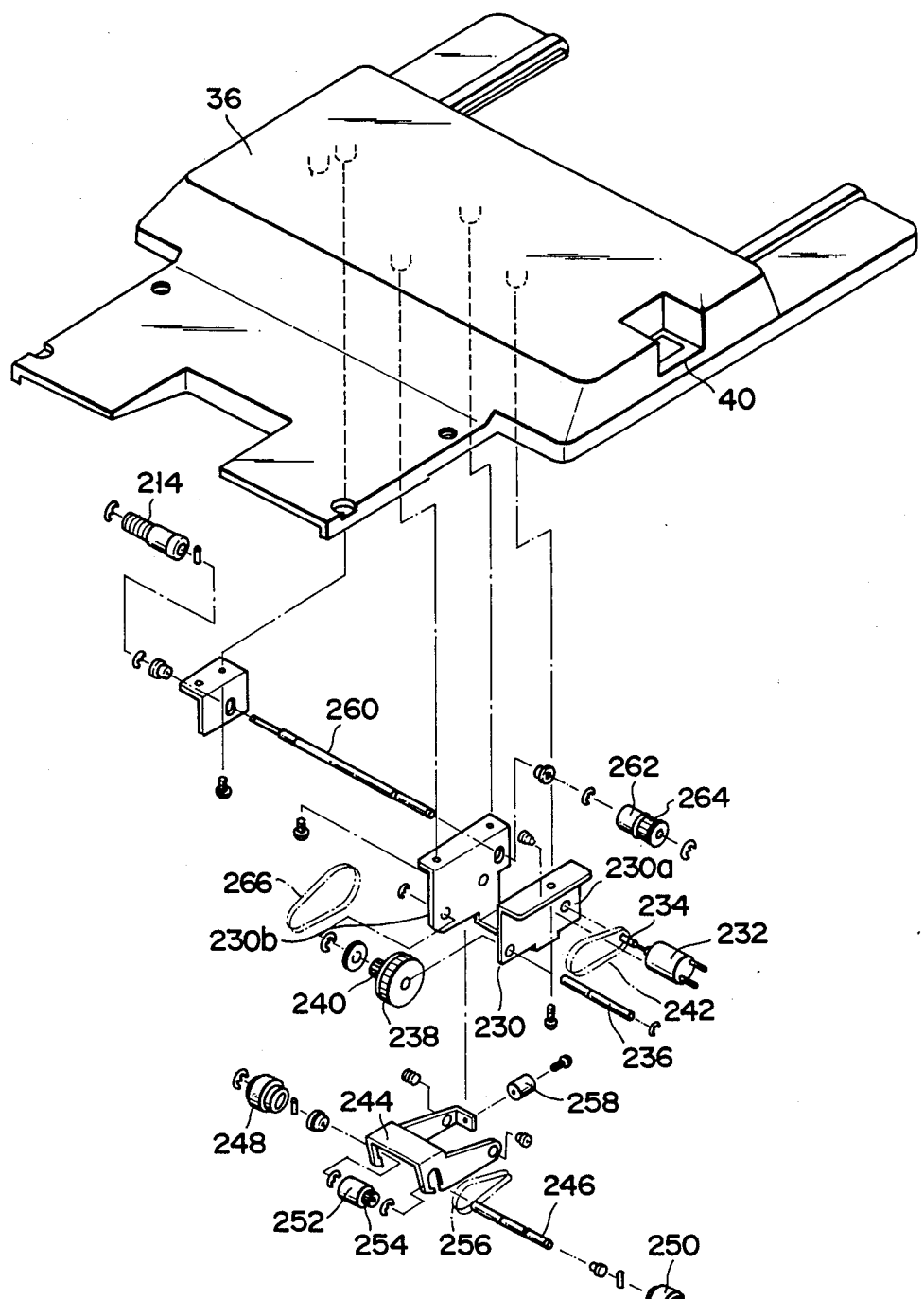

Reference is made to FIGS. 16 through 18. U-shaped frame 230 is provided on the reverse side of cover 36. First side wall 230a constituting one of the legs of U is provided with motor 232 as drive source 22. The rotating shaft of this motor 232 is coupled with pulley 234. Shaft 236 is rotatably bridged between first and second walls 230a and 230b of frame 230. Pulleys 238 and 240 are rotatably coupled with shaft 236. Timing belt 242 is applied to pulleys 238 and 234. Movable member 244 is swingably mounted at the base end to shaft 236. Movable member 244 is coupled at the top end with shaft 246, and rotatable about shaft 246. The ends of shaft 246 are respectively secured to rollers 248 and 250 for picking up paper P placed on table 160. Pulley 254 is secured to shaft 246, through one-way clutch 252. Timing belt 256 is applied to pulleys 254 and 240. Therefore, when motor 232 is rotated in a direction, rollers 248 and 250 are rotated to pick up paper P. When it is rotated in the reverse direction, these are stopped in rotation. Dead weight 258 for balancing is coupled with the base end of movable member 244.

Shaft 230b is rotatably coupled with second frame 230b. Worm gear 214 is attached to one end of shaft 260. Pulley 264 is attached to the other end, with one-way clutch 262 intervening therebetween. Timing belt 266 is applied to these pulleys 264 and 240. With this structure, when motor 232 is rotated in a direction, worm gear 214 is prohibited to rotate, while when it is reversely rotated, worm gear 214 is allowed to rotate. Thus, rollers 248 and 250, and paper table 160 are selectively driven according to the rotating direction of motor 232.

Figure 19:
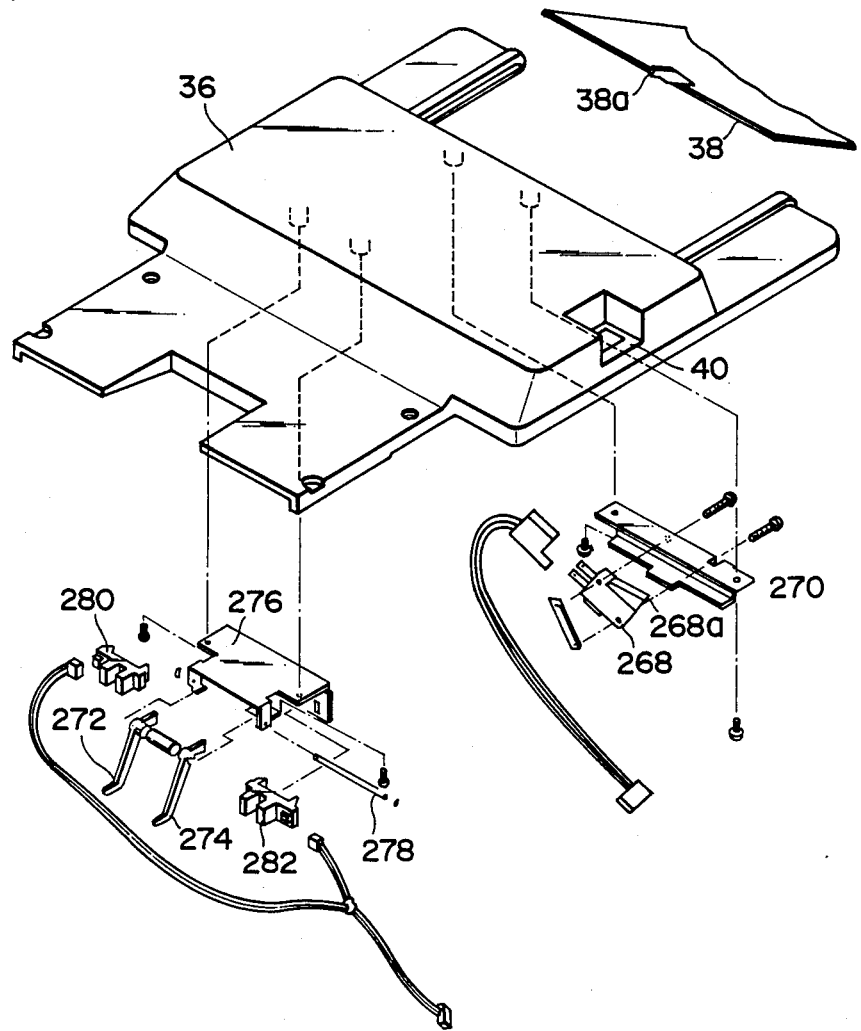

Switch 268 for sensing the open and close of door 38 is supported by supporting member 270, which is attached to the reverse side of cover 36, as shown in FIGS. 17 and 19. Operating reed 268a of switch 268 is in contact with operating member 38a of cover 38.

Level detecting member 272 as level detector 8 for detecting a height of paper table 160, and no paper detecting member 274 as no paper detector for detecting no paper on table 160 are located near roller 248.

These detecting members 272 and 274 are swingably coupled at the mid portions with shaft 278 of frame 276, which is attached to the reverse side of cover 36. Level sensor 280 and no paper sensor 282 are attached to frame 276. These sensors may be photo couplers or photo sensors, for example. One end of each of these detecting members 272 and 274 may move to cross the optical path of the light emitting element and the photo sensing element, which make up each sensor 280 and 282. These sensors 280 and 282 senses the crossing of the detecting members. A height of stacked paper and absence of paper on paper table 160 may be detected on the basis of the sensing results.

Printed circuit board PCB containing the control circuitry is mounted on the reverse side of cover 36. The PCB is covered with metal cover MC.

The internal structure of connecting mechanism 34 will be further described referring to FIGS. 20 through 23.

Figure 21:
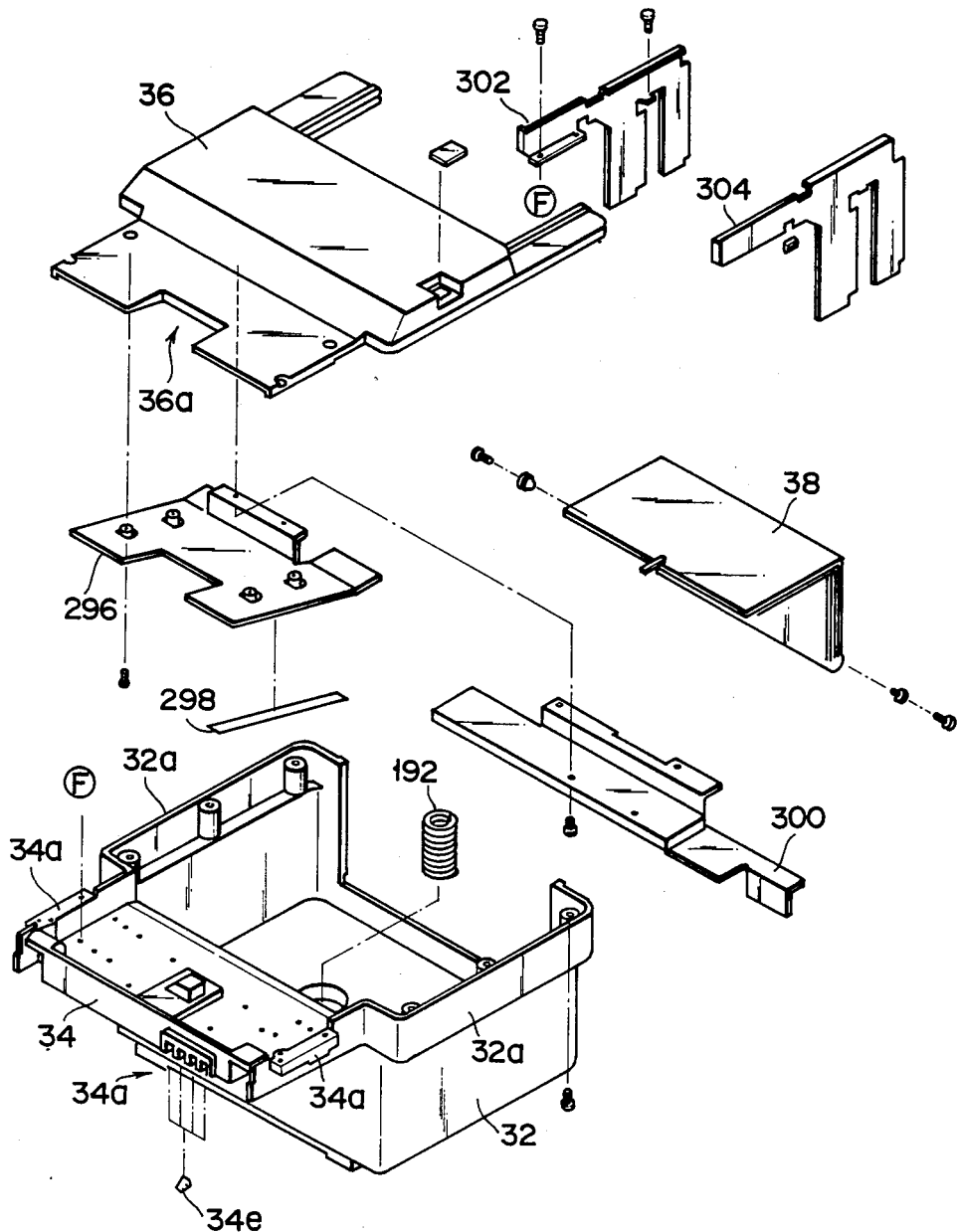
Figure 22:
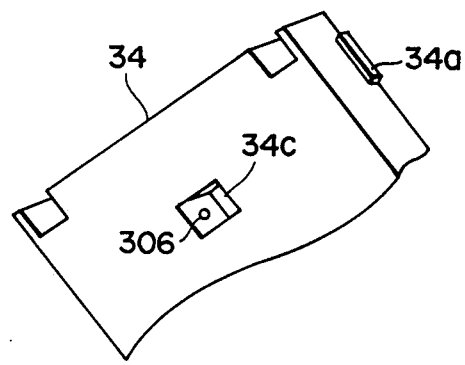
FIGS. 22 and 23 show plan and side views showing a mechanism for indicating that no paper is present.
Figure 23:
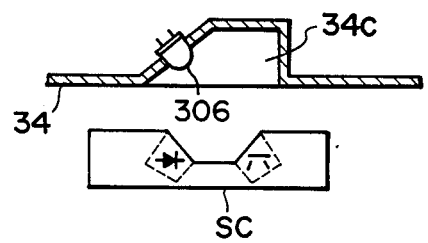

In FIG. 20, within connecting mechanism 34, first and second paper sensors 284 and 286 making up paper sensor 4 for sensing paper are supported by supporting members 288 and 290, which are arrayed along the transport path of paper P picked up from paper table 160. First and second paper sensors 284 and 286 are, for example, of the reflecting type in which light beam is applied to the transporting paper, and the light beam reflected at the paper is used for paper sensing. First and second paper sensors 284 and 286 are covered with first paper guide 294, which is mounted on connecting mechanism by supporting member 292. When sensing the transporting paper, the sensing by those sensors is performed through through-holes 294a and 294b of first paper guide 294. Paper size display 34d is provided on the surface of the top end of connecting mechanism. In display 34d, code data representing paper size is set up depending on a position of click 34e as manually set (FIG. 21). When the connecting mechanism 34 of feed apparatus 30 is inserted into copy machine main body 50, the copy machine detects this click 34e by a micro switch (not shown), and decides the size of paper by the detection.

Second paper guide 296 is mounted on the reverse side portion of cover 36 covering connecting mechanism 34. Black sheet member 298 is mounted on the surface of second paper guide 296 where this guide face first and second paper sensors 284 and 286. When no paper is present, this black sheet member provides no reflecting light beam.

Harness 300 is mounted on the reverse side of cover 36. Frame 276, PCB and the like are mounted on harness 300. Connecting mechanism 34 further contains third and fourth paper guides 302 and 304 for guiding both sides of paper. The base ends of third and fourth paper guides 302 and 304 are contained in main body 32.

Finally, how feed apparatus 30 informs the copy machine of "no paper" information representing that paper is used up in the feed apparatus.

Feed apparatus 30 operates in an off-line manner in connection with the copy machine, since only electrical connection between these is for the power supply. It is necessary to inform the copy machine of "no paper" somehow.

The feed cassette loading mechanism 52 of copy machine main body 50 uses a reflecting type paper sensor consisting of a light emitting element and a photo sensing element. The light beam emitted from the light emitting element applied to the inside of the loaded feed cassette, through a through-hole of the bottom of the cassette. The reflecting light from the paper in the feed cassette, if it contains, is used for checking if paper is present or absent in the cassette.

More specifically, recess 34c is formed in the reverse side of connecting mechanism 34. Light emitting diode 306 is located in this recess 34c. When the feed cassette is loaded into main body 50, recess 34c is aligned with paper sensor SC of main body 50. Diode 306 lights on when no paper detecting member 274 and no paper sensor 282 decide that paper is present. When paper is used up, it lights off to inform copy machine main body 50 of "no paper".

The operation of feed apparatus 30 thus arranged will be described.

To supply paper to feed apparatus 30, door 38 is opened as shown in FIG. 3. Then, paper table 160 is pushed down against an elastic force of spring 192. When door 38 is opened, first lever 216 constituting the drive force coupling means is pushed up by the elastic force of spring 228, so that paired gears 224 and 226 of the second lever are detached from paired gears 194 and 200. Under this condition, paper table 160 is pushed down against the elastic force of spring 192 and the resistance between worm gear 214 and gear 212.

A stack of paper P is placed on table 160, and door 38 is closed. Switch 268 is turned on. In turn, motor 232 as drive source 22 is rotated in the second direction under control of controller 2 and motor driver 20. In this rotating direction of the motor, one-way clutch 252 prohibits rollers 248 and 250 from rotating. Only worm gear 214 is allowed to rotate by one-way clutch 262. The worm gear rotation drives gear 212, and a chain of gears 210 to 200.

When door 38 is closed, first lever 216 is pushed down. The gears 224 and 226 of second lever 222 are in mesh with gears 194 and 200. Under this condition, gears 200 and 194 rotates together. This indicates that the drive power of motor 232 is effectively transferred to gear 194. With rotation of this gear 194, gear 166 is rotated to lift paper table 160 through the aid of timing belts 182 and 184.

As table 160 rises, paper becomes in contact with rollers 248 and 250. Level detecting member 272 and no paper detecting member 274 also start to swing, so that level sensor 280 and no paper sensor 282 are turned off. Upon turn-off of these sensors, controller 2 and motor driver 20 stop motor 232, and lights LED 306. Following this, motor 232 is rotated reversely, i.e., in the first direction, to feed a sheet of paper on table 160 in a called stand-by position. To be more specific, with the motor rotation in the reverse direction, one-way clutch 262 prohibits worm gear 214 from rotating. One-way clutch 252 allows rollers 248 and 250 to rotate. Rotating rollers 248 and 250 pick up paper P on table 160 and feed it toward copy machine main body 50. First and second paper sensors 284 and 286 sense this moving paper, and transfers paper sensing signals to controller 2 and motor driver 20. Upon receipt of the signals, those circuits stops motor 232 in rotation, so that paper P is located in the stand-by position where paper P is seen through notch 36a of cover 36.

When paper table 160 is lifted at full load and motor 232 is stopped, paper table 160 is driven through worm gear 214, as already described. Therefore, the resistance between worm gear 214 and gear 212 and the elastic force of spring 192 cooperate to support the lifted table 160.

Under this condition, if the copy machine enters the copying operation, pick-up roller 54 of main body 50 drops to contact paper P located in the stand-by position. Paper is picked up by one-turn rotation of the roller. After paper P is picked up, pick-up roller 54 rises to return to the original position. When the trailing edge of paper P passes first paper sensor 284, this sensor is turned off and sends a signal representing the turn-off to controller 2 and motor driver 20. In turn, these circuits rotate motor 232 in the first direction. With this rotation, paper P is picked up from table 160. When the leading edge of paper P passes first paper sensor 284, the sensor senses this and motor 284 stops its rotation. The paper P previously picked up (called a first paper) is further fed into the copy machine, and second paper sensor 286 is turned off. In response to this state of sensor, controller 2 and motor driver 20 drive the motor to rotate in the first direction again. This motor rotation feeds the paper P which has stopped at the position of first paper sensor 284 (called a second paper), into the copy machine inside. Second paper sensor 284 senses the leading edge of the second paper, and motor 232 is stopped. Paper P is stopped in the standby position. Subsequently, the above sequence of operations will be performed with progression of the copying operation by the copy machine.

When paper P on paper table 160 is used up, no paper detecting member 274 drops into through-hole 160a of paper table 160, and no paper sensor 282 is turned on. In turn, controller 2 lights off LED 306, to inform the copy machine of "no paper" in feed apparatus 30. Upon receipt of this, th copy machine indicates "no paper" by a suitable means, for example, an indication lamp on the operation panel.

Motor 232 is rotated in the first direction. Paper P is picked up from paper table 160, and placed in the standby position. Approximately 0.5 sec. elapses from then; however, first paper sensor 284 and/or paper sensor 286 does not senses paper yet. The controller of the copy machine decides this situation to be occurrence of paper jam, and lights the indicator 44 representing paper jam. Further, LED 306 lights off to indicate "no paper", and the copy machine lights an indicator on the control panel to request an operator to supply paper in the feed apparatus.

The embodiment under discussion employs the endless timing belts 182 and 184 for lifting paper table 160. Therefore, there is no need for fixing the ends of belts. The end fixing work is indispensable for wires or ended timing belts. Further, to fix the ends to pulleys and the paper table, the grooves of pulleys must be wide. This may lead to increase of the size of the feed apparatus. For the above reasons, according to the embodiment of this invention, the timing belts may be set to the related pulleys simply, providing easy assembling and maintenance. Further, the embodiment may hold back the increase of the apparatus size.

It is noted that in the above-mentioned embodiment, paper table 160 is attached to the parallel arrayed timing belts 182 and 184. This feature ensures the horizontal posture of paper table 160. Therefore, paper table 160 may be smoothly moved irrespective of a shift of a force applied point on the table resulting from its movement.

Additionally noted here that one-way clutches 252 and 262 are used for selectively transmitting a drive force from motor 232 to worm gear 214, and rollers 248 and 250. Use of these clutches enable a single motor to drive paper table 160 and to feed paper P. This feature leads to size reduction and cost reduction of the feed apparatus. Further, the table drive and the paper feed are staggered in execution. This allows use of a small motor, resulting in the need of small power capacity.

As recalled, spring 192 is used for pushing up table 160, and the elastic force of this spring is slightly weaker than the force to move a maximum volume of paper placed on paper table 160. Therefore, the drive power of motor 32 is only a difference between the maximum paper weight and the elasticity of the spring, not the drive power enough to lift the paper of the maximum weight. This feature provides useful industrial effects such as size reduction and cost reduction of the feed apparatus.

Additionally noted that the sum of the motor drive force and the elastic force of spring is used for lifting the paper table. For lifting the table, varied elasticity of springs manufactured must be little allowed for. Because the summed force is used, the elastic force of the spring used may be smaller than that when only the spring is used for lifting the table. This implies that an operator can push down the paper table by a relatively small force, and hence the operability of the feed apparatus is improved.

The drive mechanism for driving the paper table is made up of worm gear 214 and gear 211 in mesh with it, and the like. Resistance between these gears prevents paper table 160 from suddenly rising due to the spring force.

The protruded portions 32a are spaced with a distance equal to the width of connecting mechanism 34. The portion including connecting mechanism 34 and protruded portions 32a resembles the normal feed cassette. Therefore, an operator may handle the feed apparatus with a similar feeling of handling the normal cassette.

Paper table 160 and the lift mechanism for lifting the table are located between first and second side frames in feed apparatus main body 32. Motor 232 for driving the lift mechanism, the PCB containing the control circuitry for controlling the motor, and the transport mechanism are mounted on the cover 38. These structural features provide advantageous effects in assembling and maintenance of the feed apparatus. Specifically, the lift mechanism, and the PCB and the transport mechanism may be assembled in separate lines, and further may be inspected and adjusted separately.

The "no paper" in the feed apparatus is indicated by LED 306 mounted on the reverse side of connecting mechanism 34, and is transferred to the copy machine. On the other hand, the conventional feed apparatus uses a mechanical shutter, which is provided in alignment with the no paper sensor SC of the copy machine main body 50, and operates in response to presence and absence of paper. The feed apparatus according to this invention does not require such a mechanical shutter. This feature provides cost reduction and improvement of the reliability.

Furthermore, first side frames 152 and 154 are made of metal, and main body 32 is made of synthetic resin. Therefore, weight of the feed apparatus is remarkably reduced when comparing with the apparatus in which the frame, and various components and parts housed therein are all made of metal.

The first and second side frames 152 and 154 are provided with leg portions 152a and 154a, respectively. These leg portions are fixedly secured to the protruded portions 34a and 34a of connecting mechanism 34. These protruded portions reinforce the connecting mechanism made of synthetic resin.

Additionally, main body 32 of the feed apparatus provided with supporting member 48 attached to the bottom side. When the feed apparatus is loaded into the copy machine main body, the supporting member 48 is in contact with table T on which the copy machine is placed, or the main body 50 per se. Provision of the supporting member horizontally postures the feed apparatus when it is coupled with the copy machine, and further reduces the force applied to the feed apparatus main body.

The microcomputer of the control circuit may be substituted by any other suitable electronic circuit, if it has the same control functions as the microcomputer.

What is claimed is:

1. A feed apparatus for feeding image forming media to an image-forming apparatus, comprising:
   means for holding said image forming media, said holding means being movable between a feed position from which the image forming media are fed into the image-forming apparatus and a non-feed position;
   means for constantly urging said holding means toward the feed position, said urging means having a predetermined urging force;
   means for producing a driving force to move said holding means, said holding means being moved to the feed position by utilization of both the driving force and the urging force; and
   means for permitting the driving force of said producing means to be transmitted to said holding means only in the case where said holding means should be moved to the feed position, and for, in the other cases, preventing a force acting toward the feed position from being transmitted to said holding means, except for the urging force of said urging means.

2. An apparatus according to claim 1, wherein said permitting/preventing means includes a one-way power transmitting means.

3. An apparatus according to claim 2, wherein said permitting/preventing means includes a first gear provided in said one-way power transmitting means,
   a shaft having said one-way power transmitting means, when said holding means is moved in said non-feed position, said shaft being rotated together with said one-way power transmitting means, when said holding means is moved in said feed position, only said one-way power transmitting means being rotated; and
   a second gear fixed to said shaft, said second gear being driven by said producing means.

4. An apparatus according to claim 1, wherein said permitting/preventing means includes endless belts coupled with said holding means so as to move said holding means, and pulleys means for supporting said endless belts so as to move said endless belts.

5. An apparatus according to claim 1, wherein said urging means has an urging force slightly smaller than the force to move the image forming media of a maximum weight placed on said holding means.

6. An apparatus according to claim 5, wherein said urging means has a spring.

7. An apparatus according to claim 5, wherein said producing means includes a motor and a motor driver for controlling the drive power of said motor.

8. An apparatus according to claim 3, further comprising an open/close means covering said holding means, and means for interlocked with said open/close means, when said open/close means is closed, said interlocked means rotating said first and second gears simultaneously.

9. An apparatus according to claim 8, wherein said interlocked means is a pair of gear means rotating in mesh with said first and second gears.

10. An apparatus according to claim 9, wherein said open/close means has a door.

* * * * *